United States Patent
Katdare

(10) Patent No.: US 11,068,261 B1
(45) Date of Patent: Jul. 20, 2021

(54) METHOD AND SYSTEM FOR DEVELOPING MICROSERVICES AT SCALE

(71) Applicant: JPMorgan Chase Bank, N.A., New York, NY (US)

(72) Inventor: Amol R. Katdare, Plano, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/746,174

(22) Filed: Jan. 17, 2020

(51) Int. Cl.
*G06F 8/77* (2018.01)
*G06F 8/41* (2018.01)

(52) U.S. Cl.
CPC . *G06F 8/77* (2013.01); *G06F 8/43* (2013.01)

(58) Field of Classification Search
CPC .................................. G06F 8/77; G06F 8/43
USPC .................................................. 717/101–120
See application file for complete search history.

(56) References Cited

U.S. PATENT DOCUMENTS

| | | | |
|---|---|---|---|
| 7,421,458 B1* | 9/2008 | Taylor | G06F 16/289 |
| 2005/0027542 A1* | 2/2005 | Bordawekar | G06F 8/10 |
| | | | 717/124 |
| 2016/0124742 A1* | 5/2016 | Rangasamy | H04L 41/0803 |
| | | | 717/103 |
| 2019/0325353 A1* | 10/2019 | Aftab | G06N 20/00 |
| 2020/0106857 A1* | 4/2020 | Rezek | H04L 67/327 |
| 2020/0244638 A1* | 7/2020 | Gupta | G06F 9/50 |

OTHER PUBLICATIONS

Ueda, Takanori, Takuya Nakaike, and Moriyoshi Ohara. "Workload characterization for microservices." 2016 IEEE international symposium on workload characterization (IISWC). IEEE, 2016.pp. 85-94 (Year: 2016).*

Zhou, Xiang, et al. "Delta debugging microservice systems with parallel optimization." IEEE Transactions on Services Computing (2019).pp. 1-14 (Year: 2019).*

Guerrero, Carlos, Isaac Lera, and Carlos Juiz. "Genetic algorithm for multi-objective optimization of container allocation in cloud architecture." Journal of Grid Computing 16.1 (2018): pp. 113-135. (Year: 2018).*

Berger, Christian, Bjornborg Nguyen, and Ola Benderius. "Containerized development and microservices for self-driving vehicles: Experiences & best practices." 2017 IEEE International Conference on Software Architecture Workshops (ICSAW). IEEE, 2017.pp. 7-12 (Year: 2017).*

(Continued)

*Primary Examiner* — Satish Rampuria
(74) *Attorney, Agent, or Firm* — Greenblum & Bernstein, P.L.C.

(57) ABSTRACT

A method for providing a development accelerator for microservices is provided. The method includes obtaining a code set that includes first computer program codes representing a framework for developing microservices in a network environment; obtaining, from the network environment, runtime routines relating to second computer program codes of network functions with respect to the microservices; compiling, in a data package, the runtime routines, the code set, and an instruction set relating to textual directions for developing the microservices; and storing the data package in a central repository.

20 Claims, 6 Drawing Sheets

(56) References Cited

OTHER PUBLICATIONS

Liu, Desheng, et al. "Cide: An integrated development environment for microservices." 2016 IEEE International Conference on Services Computing (SCC). IEEE, 2016.pp. 809-812 (Year: 2016).*

Marquez, Gaston, Felipe Osses, and Hernan Astudillo. "Review of architectural patterns and tactics for microservices in academic and industrial literature." IEEE Latin America Transactions 16.9 (2018): pp. 2321-2327. (Year: 2018).*

* cited by examiner

METHOD AND SYSTEM FOR DEVELOPING MICROSERVICES AT SCALE

BACKGROUND

1. Field of the Disclosure

This technology generally relates to methods and systems for developing microservices, and more particularly to methods and systems for providing a development accelerator to optimize microservices development in a network environment.

2. Background Information

Many business entities implement a microservices architecture as a software development technique to structure applications across a network environment. Businesses structure applications as many smaller services instead of one large monolith to take advantage of several benefits such as, for example, improved modularity. Historically, microservices have been implemented across many network environments resulting in varying degrees of success with respect to maintaining integration with other network tools and limiting microservice interference with respect to orthogonal concerns.

One drawback of using conventional methods to implement microservices across a network environment is that, in many instances, there are many microservices to build and manage once a monolith application is broken down into multiple microservices. Further, developers must be aware of a plethora of orthogonal concerns with respect to each of the numerous microservices. As a result, developing a particular microservice and verifying that the particular microservice satisfies a business entity's quality and security standards may become a cumbersome and inefficient process, especially for business entities implementing microservices at scale in large and complex network environments.

Therefore, there is a need for a microservices development accelerator which addresses orthogonal concerns within a business entity's network environment and allows developers to quickly build microservices satisfying the business entity's functional requirements and operational standards at scale.

SUMMARY

The present disclosure, through one or more of its various aspects, embodiments, and/or specific features or sub-components, provides, inter alia, various systems, servers, devices, methods, media, programs, and platforms for providing a development accelerator to optimize microservices development in a network environment.

According to an aspect of the present disclosure, a method for providing a development accelerator for microservices is provided. The method is implemented by at least one processor. The method includes obtaining at least one code set that includes a first plurality of computer program codes representing a framework for developing a plurality of microservices in a network environment; obtaining, from the network environment, a plurality of runtime routines relating to a second plurality of computer program codes of network functions with respect to the plurality of microservices; compiling, in a data package, the plurality of runtime routines, the at least one code set, and at least one instruction set relating to textual directions for developing the plurality of microservices; and storing the data package in a central repository.

In accordance with an exemplary embodiment, the method may further include automatically checking the at least one code set in the central repository at a plurality of predetermined intervals; detecting at least one orthogonal concern relating to interactions between each of a plurality of existing microservices in the network environment and the at least one code set; and displaying, via a display, at least one alert on a graphical user interface when the at least one orthogonal concern may be detected.

In accordance with an exemplary embodiment, the at least one alert may include a textual notification.

In accordance with an exemplary embodiment, the at least one alert may include at least one audible alert on a client device.

In accordance with an exemplary embodiment, the at least one textual notification may include information corresponding to the interactions between each of the plurality of existing microservices and the at least one code set.

In accordance with an exemplary embodiment, the automatic checking may include using at least one of a static code analysis technique and a dynamic code analysis technique.

In accordance with an exemplary embodiment, the method may further include obtaining at least one first runtime routine relating to a reporting function, wherein the reporting function automatically collects and sends metadata from each of the plurality of microservices to the central repository; and integrating the at least one first runtime routine together with the at least one code set in the central repository.

In accordance with an exemplary embodiment, the method may further include obtaining the metadata from the central repository; and displaying, via a display, the metadata for each of the plurality of microservices on a graphical user interface, wherein the graphical user interface may include a dashboard.

In accordance with an exemplary embodiment, the integrating may include using at least one of a binary code injection technique and a static binary modification technique.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
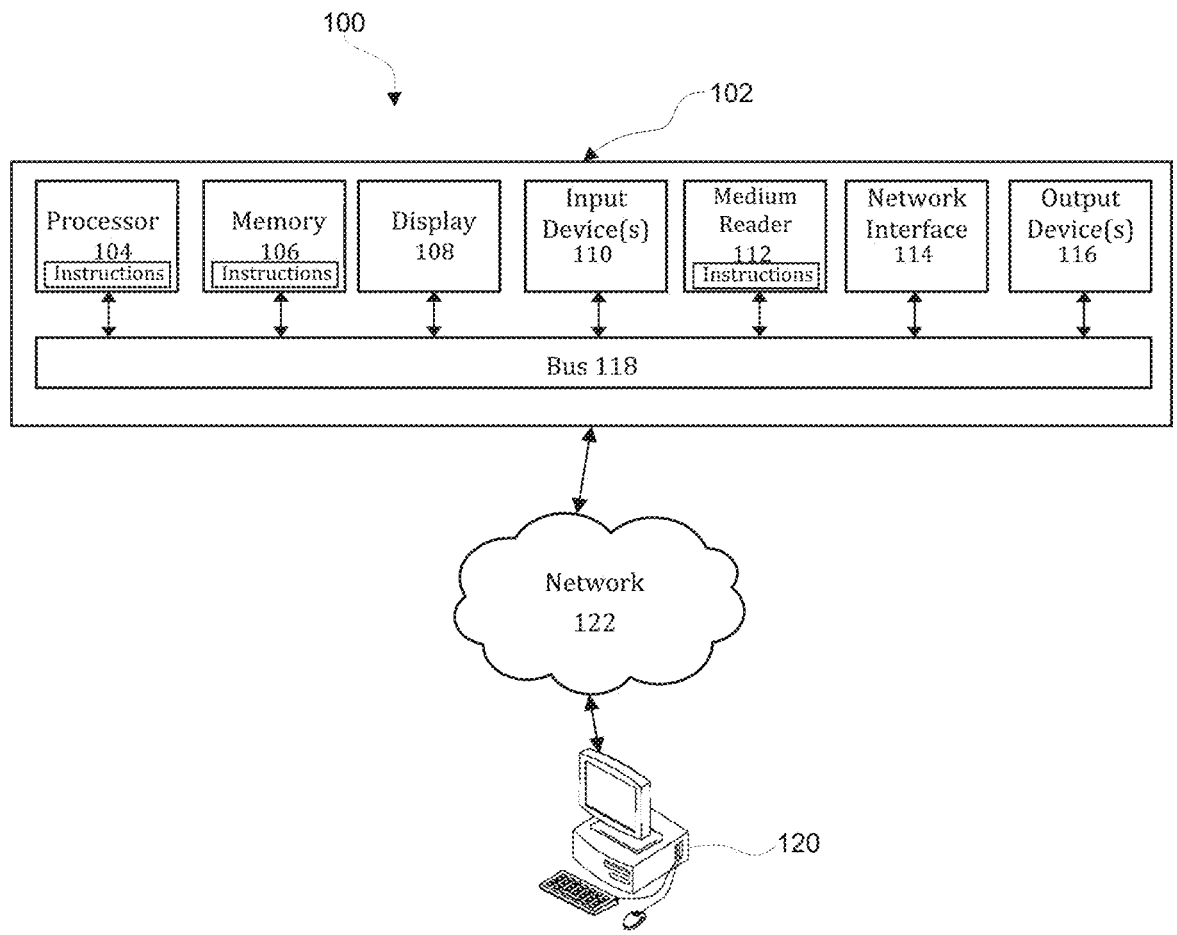
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing a development accelerator to optimize microservices development in a network environment.

Figure 2:
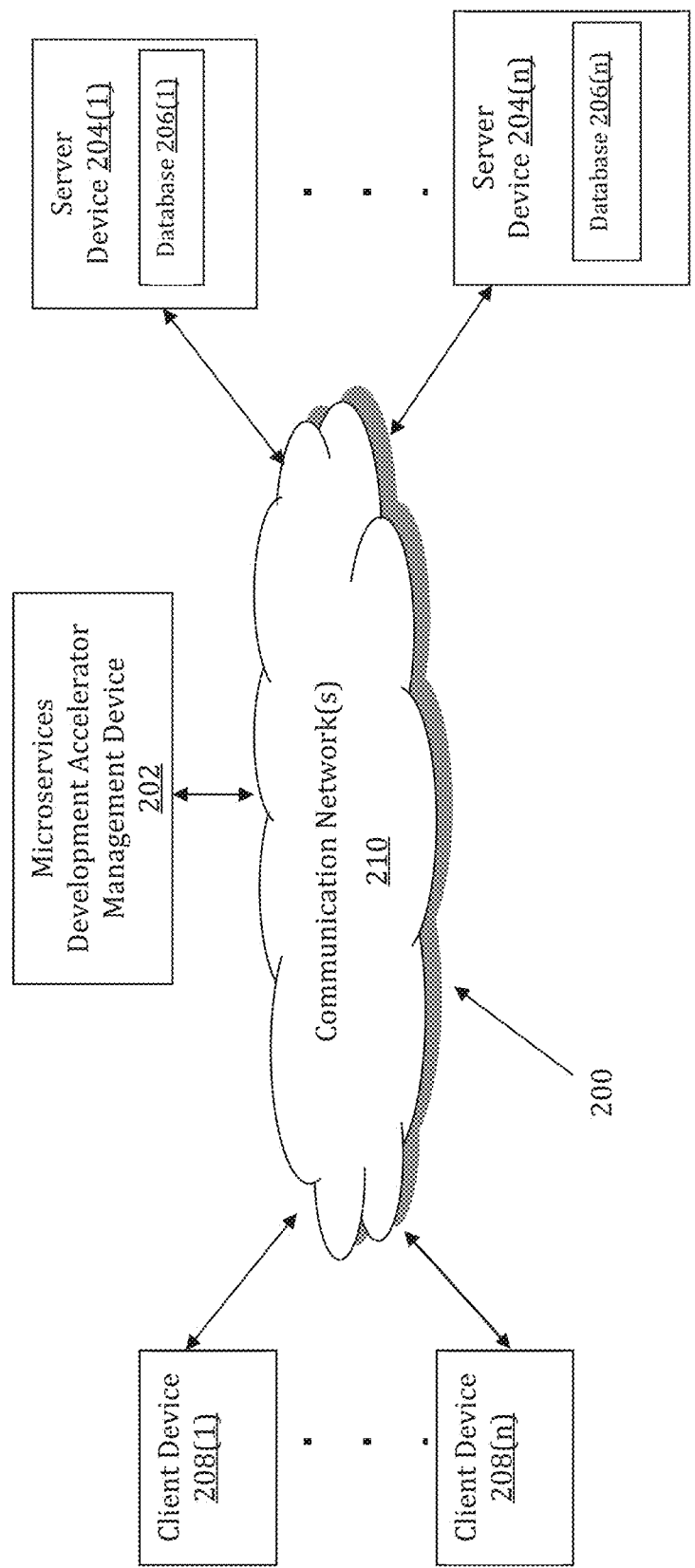
FIG. 2 illustrates an exemplary diagram of a network environment.

Referring to FIG. 2, a schematic of an exemplary network environment 200 for implementing a method for providing a development accelerator to optimize microservices development in a network environment is illustrated. In an exemplary embodiment, the method is executable on any networked computer platform, such as, for example, a personal computer (PC).

The method for providing a development accelerator to optimize microservices development in a network environment may be implemented by a Microservices Development Accelerator Management (MDAM) device 202. The MDAM device 202 may be the same or similar to the computer system 102 as described with respect to FIG. 1. The MDAM device 202 may store one or more applications that can include executable instructions that, when executed by the MDAM device 202, cause the MDAM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the MDAM device 202 itself, may be located in virtual server(s) running in a cloud-based computing environment rather than being tied to one or more specific physical network computing devices. Also, the application(s) may be running in one or more virtual machines (VMs) executing on the MDAM device 202. Additionally, in one or more embodiments of this technology, virtual machine(s) running on the MDAM device 202 may be managed or supervised by a hypervisor.

In the network environment 200 of FIG. 2, the MDAM device 202 is coupled to a plurality of server devices 204(1)-204(n) that hosts a plurality of databases 206(1)-206(n), and also to a plurality of client devices 208(1)-208(n) via communication network(s) 210. A communication interface of the MDAM device 202, such as the network interface 114 of the computer system 102 of FIG. 1, operatively couples and communicates between the MDAM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the MDAM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and MDAM devices that efficiently implement a method for providing a development accelerator to optimize microservices development in a network environment.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The MDAM device 202 may be a standalone device or integrated with one or more other devices or apparatuses, such as one or more of the server devices 204(1)-204(n), for example. In one particular example, the MDAM device 202 may include or be hosted by one of the server devices 204(1)-204(n), and other arrangements are also possible. Moreover, one or more of the devices of the MDAM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the MDAM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to data packages, metadata, code sets, runtime routines, and instruction sets.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the MDAM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the MDAM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the MDAM device 202, the server devices 204(1)-204(n), the client devices 208(l)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the MDAM device 202, the server devices 204(l)-204(n), or the client devices 208(1)-208(n), for example, may be configured to operate as virtual instances on the same physical machine. In other words, one or more of the MDAM device 202, the server devices 204(1)-204(n), or the client devices 208(1)-208(n) may operate on the same physical device rather than as separate devices communicating through communication network(s) 210. Additionally, there may be more or fewer MDAM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
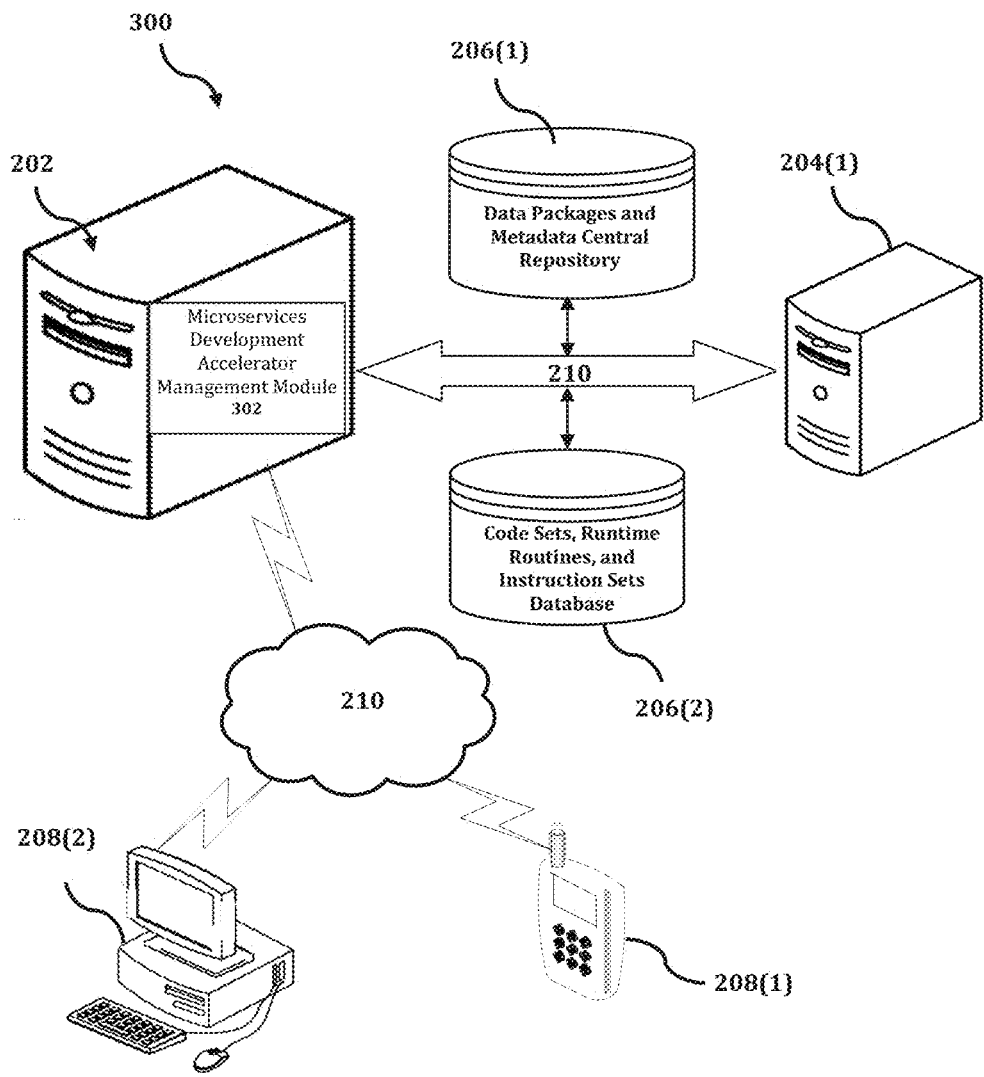
FIG. 3 shows an exemplary system for implementing a method for providing a development accelerator to optimize microservices development in a network environment.

The MDAM device 202 is described and shown in FIG. 3 as including a microservices development accelerator management module 302, although it may include other rules, policies, modules, databases, or applications, for example. As will be described below, the microservices development accelerator management module 302 is configured to implement a method for providing a development accelerator to optimize microservices development in a network environment.

An exemplary process 300 for implementing a mechanism for providing a development accelerator to optimize microservices development in a network environment by utilizing the network environment of FIG. 2 is shown as being executed in FIG. 3. Specifically, a first client device 208(1) and a second client device 208(2) are illustrated as being in communication with MDAM device 202. In this regard, the first client device 208(1) and the second client device 208(2) may be "clients" of the MDAM device 202 and are described herein as such. Nevertheless, it is to be known and understood that the first client device 208(1) and/or the second client device 208(2) need not necessarily be "clients" of the MDAM device 202, or any entity described in association therewith herein. Any additional or alternative relationship may exist between either or both of the first client device 208(1) and the second client device 208(2) and the MDAM device 202, or no relationship may exist.

Further, MDAM device 202 is illustrated as being able to access a data packages and metadata central repository 206(1) and a code sets, runtime routines, and instruction sets database 206(2). The microservices development accelerator management module 302 may be configured to access these databases for implementing a method for providing a development accelerator to optimize microservices development in a network environment.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the MDAM device 202 via broadband or cellular communication. Of course, these embodiments are merely exemplary and are not limiting or exhaustive.

Upon being started, the microservices development accelerator management module 302 executes a process for providing a development accelerator to optimize microservices development in a network environment. An exemplary process for providing a development accelerator to optimize microservices development in a network environment is generally indicated at flowchart 400 in FIG. 4.

Figure 4:
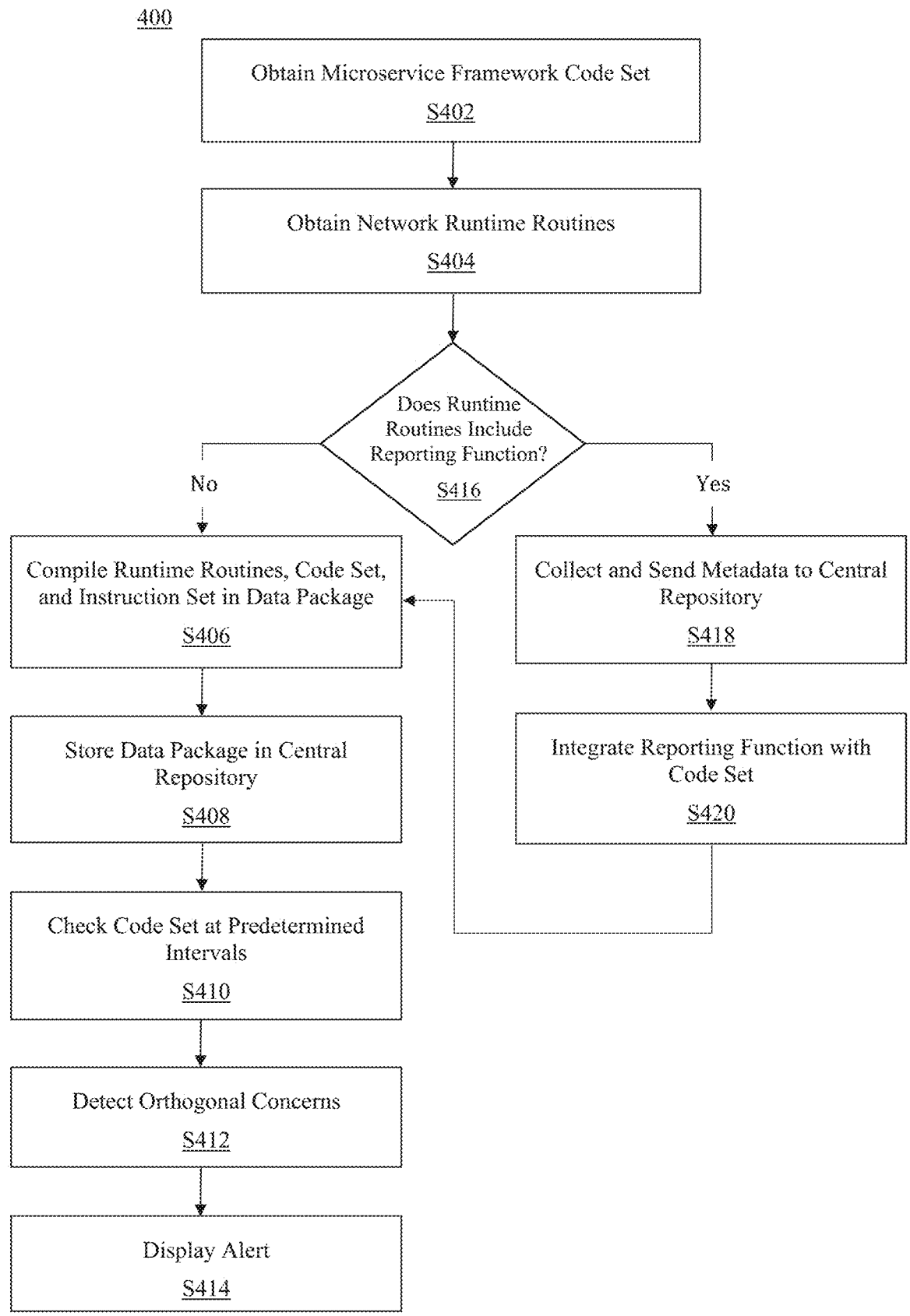
FIG. 4 is a flowchart of an exemplary process for implementing a method for providing a development accelerator to optimize microservices development in a network environment.

In process 400 of FIG. 4, at step S402, a code set that may include a first collection of computer program codes representing a framework for developing microservices in a network environment may be obtained. The code set may include any collection of computer program codes written using a human-readable programming language such as, for example, Java programming language, Microsoft's C# programing language, MATLAB programming language, VBScript programming language, and Wolfram programming language. In an exemplary embodiment, the code set may be transformed into computer-readable binary machine codes by an assembler or a compiler. In another exemplary embodiment, the code set may include high-level program structures designed and coded as a framework upon which additional functionalities may be added. The framework of functionalities in the network environment may include high-level functionalities tested to properly function in the network environment. The high-level functionalities may be selectively changed and built upon by additional user-written codes. In another exemplary embodiment, the microservices may include a software development technique and an architectural style that structures an application as a collection of coupled services.

In another exemplary embodiment, the code set may be used to develop Data Access Object (DAO) microservices platforms as well as to rigorously test the developed DAO microservices. In another exemplary embodiment, the code set may also include frameworks for software development practices such as, for example, development and operations (DevOps) techniques that combine software development and information-technology operations to shorten a system development life cycle by proving continuous delivery of microservices. The DevOps techniques may include software strategies such as, for example, providing a continuous delivery pipeline that may enable the delivery of new features to microservices developers through a constant flow of software changes via an automated software production line.

At step S404, runtime routines relating to a second collection of computer program codes of network functions with respect to the microservices may be obtained. In an exemplary embodiment, the runtime routines may include a collection of low-level routines used by a compiler to invoke behaviors in a runtime environment. The runtime environment may include a software deployment environment where the functions may be executed such as, for example, the network environment where the routines are configured to operate. The runtime routines may include any collection of computer program codes written using a human-readable programming language such as, for example, Java programming language, Microsoft's C# programing language, MATLAB programming language, VBScript programming language, and Wolfram programming language.

At step S406, the runtime routines and the code set may be compiled in a data package together with instruction sets relating to textual directions for developing the plurality of microservices. In an exemplary embodiment, the data package may include container formats that may be used to describe and package a collection of data. The container formats may include a wrapper format and a metafile format containing specifications that describe how different elements of data and metadata coexist in the data package.

In another exemplary embodiment, the instruction set may include documentations within the code set illustrating useful guidelines for developers implementing the code set.

In another exemplary embodiment, the instruction set may include an assembly manual with step-by-step guidance for a developer to implement, and build upon, the code set to develop desired microservices. In another exemplary embodiment, the instruction set may include work stream guidance outlining development context for larger, multi-microservice projects involving many developers.

At step S408, the data package may be stored in a central repository. As will be appreciated by a person of ordinary skill in the art, the data package may be organized, named, stored, and manipulated in a file system such as, for example, a File Allocation Table (FAT) type file system and a New Technology File System (NTFS) type file system. In an exemplary embodiment, the central repository may include an internal hosting service operated by a business entity or an external third-party hosting service such as, for example, GitHub.

At step S410, the method may also include automatically checking the code set in the central repository at predetermined intervals. The automatic checking may include using code verification techniques such as, for example, using a static code analysis technique and a dynamic code analysis technique.

Then, at step S412, orthogonal concerns relating to interactions between each of the existing microservices in the network environment and the code set may be detected. The orthogonal concerns may include a separation of concerns design principle for separating a computer program into distinct microservices addressing separate, noninteracting concerns such as, for example, in processing A data, microservice A should not interfere with B data relating to microservice B.

Finally, at step S414, alerts may be displayed on a graphical user interface when the orthogonal concerns are detected. The alerts may include textual notifications such as, for example, a pop-up notification on the graphical user interface. The alerts may also include audible alerts such as, for example, a notification sound file played through the speakers of a client device. In another exemplary embodiment, the textual notifications may include information corresponding to the interactions between each of the existing microservices and the code set.

In another exemplary embodiment, at step S416, the method may also include obtaining a first set of runtime routines relating to a reporting function. The reporting function may, for example, automatically collect and send metadata from each of the microservices to the central repository. In another exemplary embodiment, at step S418, the first set of runtime routines may include self-executing anonymous functions such as, for example, an Immediately Invoked Function Expression (IIFE) which executes to perform the function as soon as the IIFE is defined. The metadata received from each of the microservices may include information relating to the operation of each of the microservices such as, for example, data processing architecture information that may be compared to predetermined architecture quality standards.

Then, in another exemplary embodiment, at step S420, the first set of runtime routines may be integrated together with the code set in the central repository. Integrating the first set of runtime routines in the code set may, for example, enable the inclusion of the reporting functions into subsequently developed microservices built upon the framework of the code set. The integration process may include using techniques such as, for example, a binary code injection technique and a static binary modification technique to add the first set of runtime routines to the code set in the central repository as well as to add the first set of runtime routines to existing microservices built using the corresponding code set.

In another exemplary embodiment, the method may also include obtaining the metadata from the central repository. As previously described, active reporting functions may transmit the metadata to the central repository for storage. Then, in another exemplary embodiment, the metadata for each of the microservices may be displayed on the graphical user interface. The graphical user interface may include an information management tool such as, for example, a dashboard that visually tracks, analyzes, and displays key performance indicators, metrics, and key data points to monitor a particular objective or business process.

Figure 5:
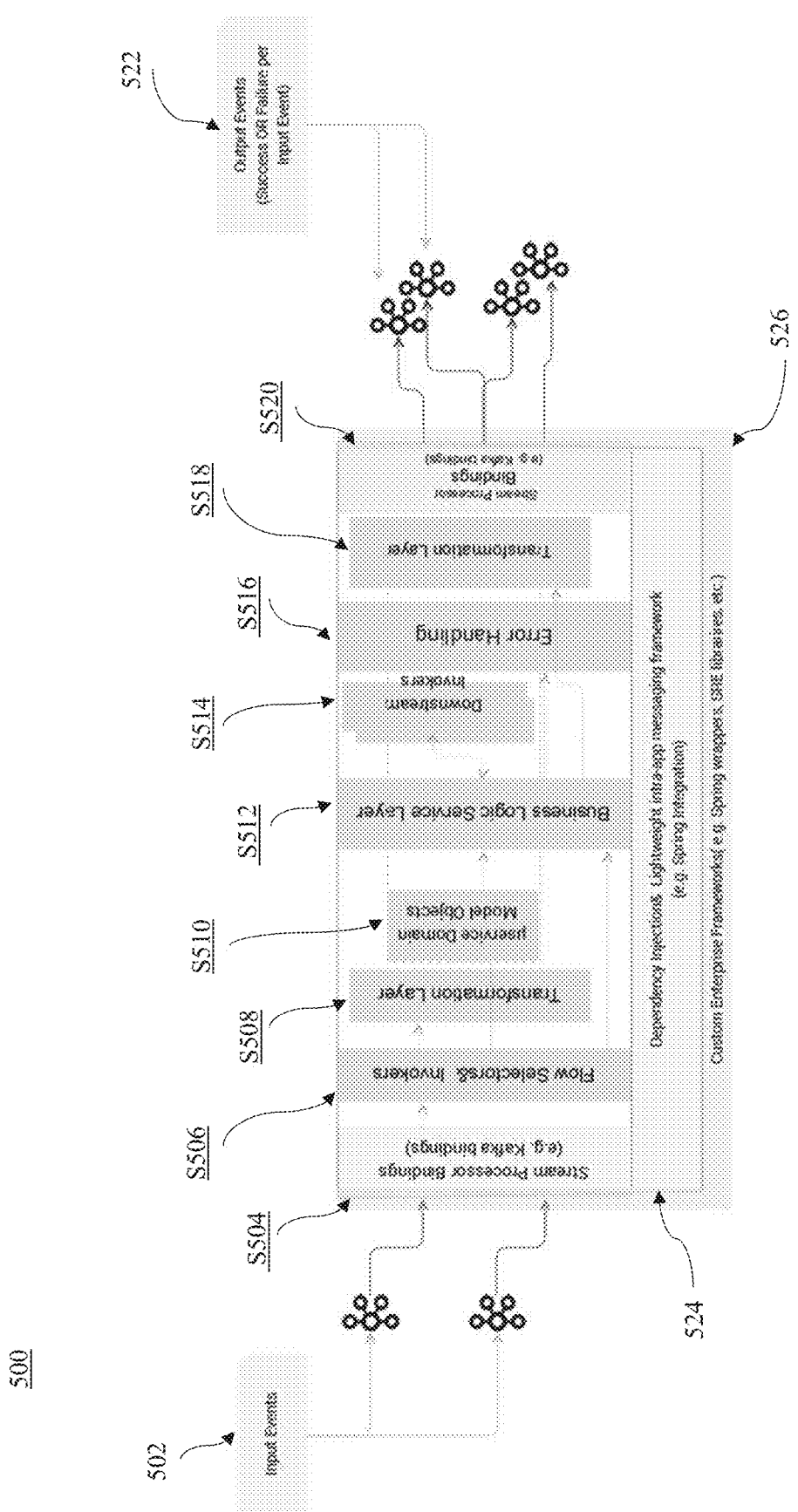
FIG. 5 is a flow diagram of an exemplary process for implementing a method for providing a development accelerator to optimize microservices development in a network environment.

FIG. 5 is flow diagram 500 of an exemplary process for implementing a method for providing a development accelerator to optimize microservices development in a network environment. In an exemplary embodiment, flow diagram 500 illustrates a development stream enabling a developer to quickly write and run small-scale proof-of-concept microservices. The exemplary process operates within custom enterprise frameworks 526 such as, for example, Spring Wrappers containing a family of service modules that contain the function calls for a library or an application programing interface (API). In another exemplary embodiment, the frameworks are customized to enable easier development of, for example, micro services within the framework as well as standardizing the development.

Further, custom enterprise framework 526 utilizes dependency injection techniques and light intra-app messaging framework 524 such as, for example, Spring Integration to have one module within the framework supply the dependencies for another module. In another exemplary embodiment, the supplied dependency of a module may be a software functionality, or a set of software functionalities, with a purpose that different clients can reuse, together with policies that control the usage.

In flow diagram 500, input events 502 begin the development process within custom enterprise framework 526. In an exemplary embodiment, input events 502 may be two developments of a microservices based application. In step S504, stream processor bindings such as, for example, Kafka bindings operate to bind and unbind the process or thread to a processing unit, or range of processing units, limiting the execution of the process or thread on the designated processing unit. At step S506, flow selectors and invokers such as, for example, Spring hypertext transfer protocol (HTTP) invoker allow for the operation of embedded remote services as if the services were available locally. In another exemplary embodiment, the flow selectors and invokers enable remote procedure calls (RPC) over HTTP. Then, at step S508, a transformation layer provides data transformation operations such as, for example, map, filter, join, and aggregations.

At step S510, microservices domain model objects provide a collection of classes and objects describing the relationships between the objects, and the properties and methods contained within the collection. In an exemplary embodiment, object-oriented principles may include abstraction, encapsulation, inheritance, and polymorphism. Then, at step S512, a business logic service layer enforces business rules that have been codified in the custom framework. At step S514, downstream invokers operate embedded remote services after business logic services are implemented. Error-handling semantics at step S516 provides custom messaging such as, for example, a report to a custom metrics system of any detected errors. Then, at steps S518 and S520, another transformation layer and stream processor binding, respectively, generate output events 522 indicating a success or failure per given input event 502.

Figure 6:
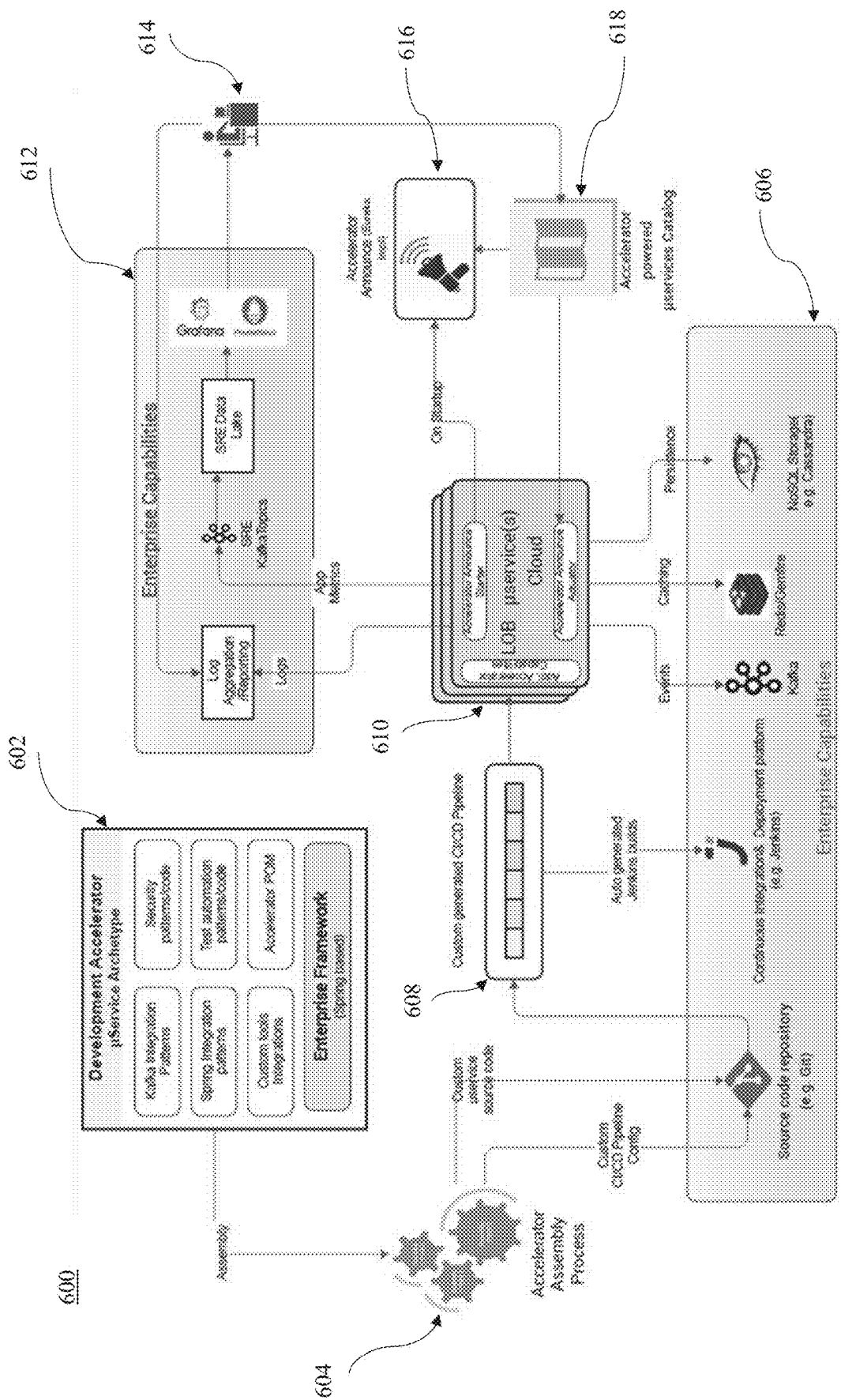
FIG. 6 is a flow diagram of an exemplary process for implementing a method for providing a development accelerator to optimize microservices development in an enterprise network environment.

FIG. 6 is flow diagram 600 of an exemplary process for implementing a method for providing a development accelerator to optimize microservices development in an enterprise network environment. In an exemplary embodiment, flow diagram 600 illustrates the development accelerator microservice archetype and the accelerator assembly process operating within an enterprise network solution. In flow diagram 600, development accelerator microservice archetype 602 includes Kafka integration patterns, Spring integration patterns custom tools integrations, security patterns/codes, test automation patterns/codes, and accelerator project object model (POM) built upon an enterprise framework such as, for example, a Spring based enterprise framework.

Development accelerator microservice archetype 602 enables the assembly of microservices at accelerator assembly process 604. Accelerator assembly process 604 utilizes enterprise capabilities 606 together with custom microservice source code and custom continuous integration/continuous deployment (CI/CD) pipeline configurations to develop custom generated (CI/CD) pipeline 608. In an exemplary embodiment, enterprise capabilities 606 may include a source code repository such as, for example, Git, a continuous integration and deployment platform such as, for example, Jenkins, an open-source stream-processing software platform such as, for example, Kafka, a data management platform such as, for example, Redis and Gemfire, and a storage infrastructure such as, for example, NoSQL Storage and Apache Cassandra.

Line of business (LOB) microservices cloud 610 may be a multi-cloud platform for the deployment, management, and continuous delivery of microservices applications, containers, and functions. In an exemplary embodiment, LOB microservices cloud 610 includes additional accelerator capabilities, accelerator announce starters, and accelerator announce actuators. Enterprise capabilities 612 serves as an intermediary between developer 614 and LOB microservices cloud 610. Enterprise capabilities 612 includes log aggregation and reporting functions as well as application metrics such as, for example, site reliability engineer (SRE) topics, SRE data lake, Grafana, and Prometheus to facilitate interactions with developer 614.

In another exemplary embodiment, accelerator announce starter may, on startup, include an accelerator announce such as, for example, Eureka implementation. Developer 614 may use accelerator powered microservices catalog 618 as a guide for accelerator announce 616 and accelerator announce actuator within the LOB microservices cloud 610. In an exemplary embodiment, accelerator announce actuator may process events using Kafka, caching into memory using Reddis/Gemfire, and persistently storing using NoSQL storage.

Accordingly, with this technology, an optimized process for providing a development accelerator to optimize microservices development in a network environment is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing a development accelerator for microservices, the method being implemented by at least one processor, the method comprising:
    obtaining, by the at least one processor, at least one code set that includes a first plurality of computer program codes representing a framework for developing a plurality of microservices in a network environment, the framework including the development accelerator to facilitate development of the plurality of microservices;
    obtaining, by the at least one processor from the network environment, a plurality of runtime routines relating to a second plurality of computer program codes of network functions with respect to the plurality of microservices;
    compiling, by the at least one processor in a data package, the plurality of runtime routines, the at least one code set, and at least one instruction set relating to textual directions for developing the plurality of microservices, the at least one instruction set including an assembly manual in a human-readable language with guidance for implementing the at least one code set to develop the plurality of microservices; and
    storing, by the at least one processor, the data package in a central repository.

2. The method of claim 1, further comprising:
    automatically checking, by the at least one processor, the at least one code set in the central repository at a plurality of predetermined intervals;
    detecting, by the at least one processor, at least one orthogonal concern relating to interactions between each of a plurality of existing microservices in the network environment and the at least one code set; and
    displaying, by the at least one processor via a display, at least one alert on a graphical user interface when the at least one orthogonal concern is detected.

3. The method of claim 2, wherein the at least one alert includes a textual notification.

4. The method of claim 2, wherein the at least one alert includes at least one audible alert on a client device.

5. The method of claim 3, wherein the at least one textual notification includes information corresponding to the interactions between each of the plurality of existing microservices and the at least one code set.

6. The method of claim 2, wherein the automatic checking includes using at least one of a static code analysis technique and a dynamic code analysis technique.

7. The method of claim 1, further comprising:
    obtaining, by the at least one processor, at least one first runtime routine relating to a reporting function, wherein the reporting function automatically collects and sends metadata from each of the plurality of microservices to the central repository; and
    integrating, by the at least one processor, the at least one first runtime routine together with the at least one code set in the central repository.

8. The method of claim 7, further comprising:
    obtaining, by the at least one processor, the metadata from the central repository; and
    displaying, by the at least one processor via a display, the metadata for each of the plurality of microservices on a graphical user interface, wherein the graphical user interface includes a dashboard.

9. The method of claim 7, wherein the integrating includes using at least one of a binary code injection technique and a static binary modification technique.

10. A computing device configured to implement an execution of a method for providing a development accelerator for microservices, the computing device comprising:
    a display screen;
    a processor;
    a memory; and
    a communication interface coupled to each of the processor, the memory, and the display screen,
    wherein the processor is configured to:
        obtain at least one code set that includes a first plurality of computer program codes representing a framework for developing a plurality of microservices in a network environment, the framework including the development accelerator to facilitate development of the plurality of microservices;
        obtain from the network environment a plurality of runtime routines relating to a second plurality of computer program codes of network functions with respect to the plurality of microservices;
        compile in a data package the plurality of runtime routines, the at least one code set, and at least one instruction set relating to textual directions for developing the plurality of microservices, the at least one instruction set including an assembly manual in a human-readable language with guidance for implementing the at least one code set to develop the plurality of microservices; and
        store the data package in a central repository.

11. The computing device of claim 10, wherein the processor is further configured to:
- automatically check the at least one code set in the central repository at a plurality of predetermined intervals;
- detect at least one orthogonal concern relating to interactions between each of a plurality of existing microservices in the network environment and the at least one code set; and
- display, via a display, at least one alert on a graphical user interface when the at least one orthogonal concern is detected.

12. The computing device of claim 11, wherein the at least one alert includes a textual notification.

13. The computing device of claim 11, wherein the at least one alert includes at least one audible alert on a client device.

14. The computing device of claim 12, wherein the at least one textual notification includes information corresponding to the interactions between each of the plurality of existing microservices and the at least one code set.

15. The computing device of claim 11, wherein the automatic check by the processor includes using at least one of a static code analysis technique and a dynamic code analysis technique.

16. The computing device of claim 10, wherein the processor is further configured to:
- obtain at least one first runtime routine relating to a reporting function, wherein the reporting function automatically collects and sends metadata from each of the plurality of microservices to the central repository; and
- integrate the at least one first runtime routine together with the at least one code set in the central repository.

17. The computing device of claim 16, wherein the processor is further configured to:
- obtain the metadata from the central repository; and
- display, via a display, the metadata for each of the plurality of microservices on a graphical user interface, wherein the graphical user interface includes a dashboard.

18. The computing device of claim 16, wherein the integration by the processor includes using at least one of a binary code injection technique and a static binary modification technique.

19. The method of claim 7, wherein the at least one first runtime routine includes a self-executing, anonymous function that automatically executes to perform a predetermined function when the self-executing, anonymous function is defined.

20. The computing device of claim 16, wherein the at least one first runtime routine includes a self-executing, anonymous function that automatically executes to perform a predetermined function when the self-executing, anonymous function is defined.

* * * * *